(12) United States Patent
Mori et al.

(10) Patent No.: US 9,399,855 B2
(45) Date of Patent: Jul. 26, 2016

(54) CONSTRUCTION MACHINE

(71) Applicants: Kobe Steel, Ltd., Kobe-shi (JP);
KOBELCO CONSTRUCTION MACHINERY CO., LTD.,
Hiroshima-shi (JP)

(72) Inventors: Yoshimune Mori, Kobe (JP); Kouji Fujikawa, Hiroshima (JP); Yasumitsu Fujii, Hiroshima (JP)

(73) Assignees: Kobe Steel, Ltd., Kobe-shi (JP);
KOBELCO CONSTRUCTION MACHINERY CO., LTD.,
Hiroshima-shi (JP)

( * ) Notice: Subject to any disclaimer, the term of this patent is extended or adjusted under 35 U.S.C. 154(b) by 0 days.

(21) Appl. No.: 14/485,932

(22) Filed: Sep. 15, 2014

(65) Prior Publication Data
US 2015/0084387 A1    Mar. 26, 2015

(30) Foreign Application Priority Data

Sep. 24, 2013  (JP) ................................. 2013-196457
May 30, 2014  (JP) ................................. 2014-112104

(51) Int. Cl.
*E02F 9/16*        (2006.01)
*B60N 2/06*       (2006.01)
(Continued)

(52) U.S. Cl.
CPC ... *E02F 9/16* (2013.01); *B60N 2/06* (2013.01); *E02F 9/166* (2013.01); *E02F 9/2004* (2013.01); *F16M 11/2092* (2013.01)

(58) Field of Classification Search
CPC .............. B60N 2/06; E02F 9/16; E02F 9/166; E02F 9/2004; F16M 11/2092

USPC ...................................... 297/344.1; 296/65.01
See application file for complete search history.

(56) References Cited

U.S. PATENT DOCUMENTS 5,244,178 A * 9/1993 Stewart .................. B60N 2/005
                                                                   248/300
7,648,115 B2 * 1/2010 Lambert .................. B60N 2/07
                                                                   244/131

(Continued)

FOREIGN PATENT DOCUMENTS

JP        61-152068 U      9/1986
JP        64-16935 U       1/1989

(Continued)

OTHER PUBLICATIONS

Extended Search Report issued Mar. 10, 2015 in European Patent Application No. 14185544.5.

(Continued)

*Primary Examiner* — Milton Nelson, Jr.
(74) *Attorney, Agent, or Firm* — Oblon, McClelland, Maier & Neustadt, L.L.P.

(57) ABSTRACT

The construction machine includes a floor plate, a seat and a control box provided on the floor plate, a support plate having an end portion, in a left-right direction, configuring a supporting end portion, on which the control box is mounted, a second slide rail that extends in a front-rear direction and is attached to a lower surface side of the support plate, and a reinforcing block that extends in a direction crossing the second slide rail in a plan view. The reinforcing block has a portion extending toward an end surface of a supporting end portion from a position in an area of the second slide rail in a plan view, and the portion being attached to the supporting end portion of the support plate.

7 Claims, 12 Drawing Sheets

(51) Int. Cl.
*F16M 11/20* (2006.01)
*E02F 9/20* (2006.01)

(56) References Cited

U.S. PATENT DOCUMENTS

| | | |
|---|---|---|
| 2005/0073184 A1 | 4/2005 | Tsuji et al. |
| 2006/0255582 A1* | 11/2006 | Kawasaki .............. B60N 2/073 280/801.1 |
| 2011/0127819 A1 | 6/2011 | Wada |
| 2011/0133529 A1* | 6/2011 | Guerrero .............. B60N 2/4221 297/216.18 |

FOREIGN PATENT DOCUMENTS

| | | |
|---|---|---|
| JP | 3-50225 U | 5/1991 |
| JP | 2000-103274 A | 4/2000 |
| JP | 2011-20641 A | 2/2011 |
| JP | 2011-106269 | 6/2011 |
| JP | 2013-26633 A | 2/2013 |

OTHER PUBLICATIONS

Office Action issued Nov. 24, 2015 in Japanese Patent Application No. 2014-112104 (with unedited computer-generated English translation).

* cited by examiner

CONSTRUCTION MACHINE

TECHNICAL FIELD

The present invention relates to a construction machine such as an excavator, and in particular, to a structure for supporting an operator seat on a floor plate of a cab.

BACKGROUND ART

An example of this technical field is disclosed in Japanese Patent Application Publication No. 2011-106269.

An operator seat structure (10) for construction machines disclosed in Japanese Patent Application Publication No. 2011-106269 includes a planar attachment bracket (50) and a seat (30) and a working machine console (40) which are provided in a line on the attachment bracket (50). Japanese Patent Application Publication No. 2011-106269 discloses that, since both the seat (30) and the working machine console (40) are attached to the same attachment bracket (50), it is possible to suppress each of the seat (30) and the working machine console (40) from vibrating independently, and as a result, to improve the operability of a working machine lever (41) and the like.

Here, as understood from FIG. 1 of Japanese Patent Application Publication No. 2011-106269, the working machine console (40) of the operator seat structure (10) is provided so as to protrude outward from the seat (30) (that is, the working machine console (40) is supported by the planar attachment bracket (50) in a cantilever form). Such a structure is adopted because the space under the working machine console (40) needs to be left as an arrangement space for a hydraulic hose or the like. Since the working machine console (40) is supported by the attachment bracket (50) in a cantilever form, such a structure is disadvantageous in that the working machine console (40) is likely to tilt and vibrate in a left-right direction as a result of deformation due to bending in the up-down direction of the attachment bracket (50).

Paragraph 0011 of Japanese Patent Application Publication No. 2011-106269 discloses that, since the working machine console is attached to a dedicated attachment bracket capable of supporting a seat together with the seat unlike a conventional working machine console which is attached to a frame of a seat, it is possible to secure sufficient attachment strength of the working machine console. However, after all, it is considered that the attachment strength of the working machine console is secured by employing a thick attachment bracket in Japanese Patent Application Publication No. 2011-106269.

SUMMARY OF INVENTION

An object of the present invention is to provide a construction machine capable of effectively improving rigidity in an up-down direction of a structure for supporting a control box without greatly changing the thickness of a conventional plate attached to a working machine console (control box) and conventional structures around the control box.

The present invention provides a construction machine including: a floor plate; a seat provided on the floor plate; a control box arranged on the floor plate so as to be aligned with the seat in a left-right direction; a support plate that supports the seat and the control boxes on the floor plate and that includes an end portion in the left-right direction configuring a supporting end portion on which the control box is mounted; a slide rail that extends in a front-rear direction on a side closer to the center in the left-right direction of the support plate than an end surface of the supporting end portion and is attached to the support plate in order to allow at least one of the seat and the control box to slide in the front-rear direction relative to the floor plate; and a reinforcing member that extends in a direction crossing the slide rail in a plan view and that includes a portion extending toward the end surface of the supporting end portion from a position in an area of the slide rail in a plan view, and the portion being attached to the supporting end portion of the support plate.

According to the present invention, it is possible to effectively improve rigidity in an up-down direction of the supporting end portion of the support plate for supporting a control box without greatly changing the thickness of a conventional plate to which the control box is attached and conventional structures around the control box.

DESCRIPTION OF EMBODIMENTS

Hereinafter, embodiments of the present invention will be described with reference to accompanying drawings. The embodiments below are specific examples of the present invention and are not intended to limit the technical scope of the present invention.

First Embodiment

Figure 1:
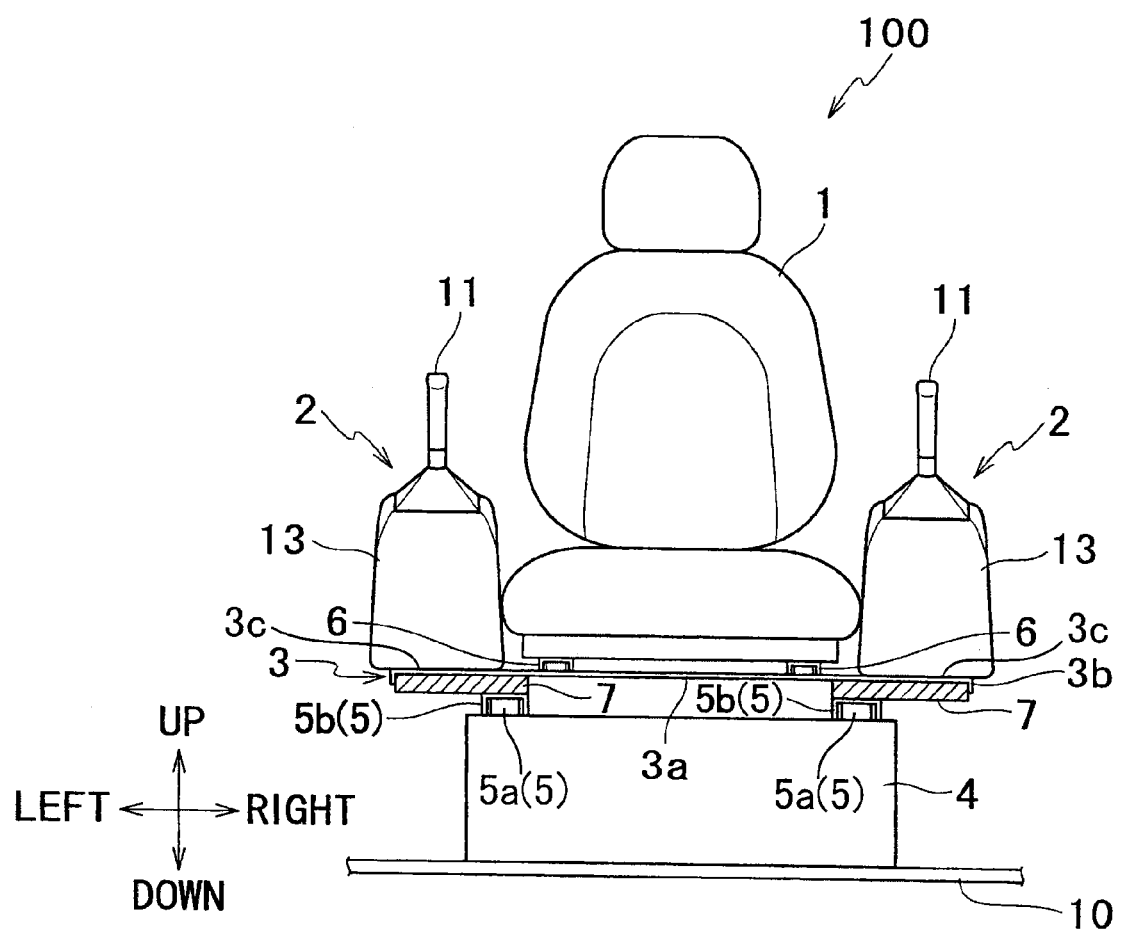
FIG. 1 is a front view of a seat structure of a construction machine according to a first embodiment of the present invention.
Figure 2:
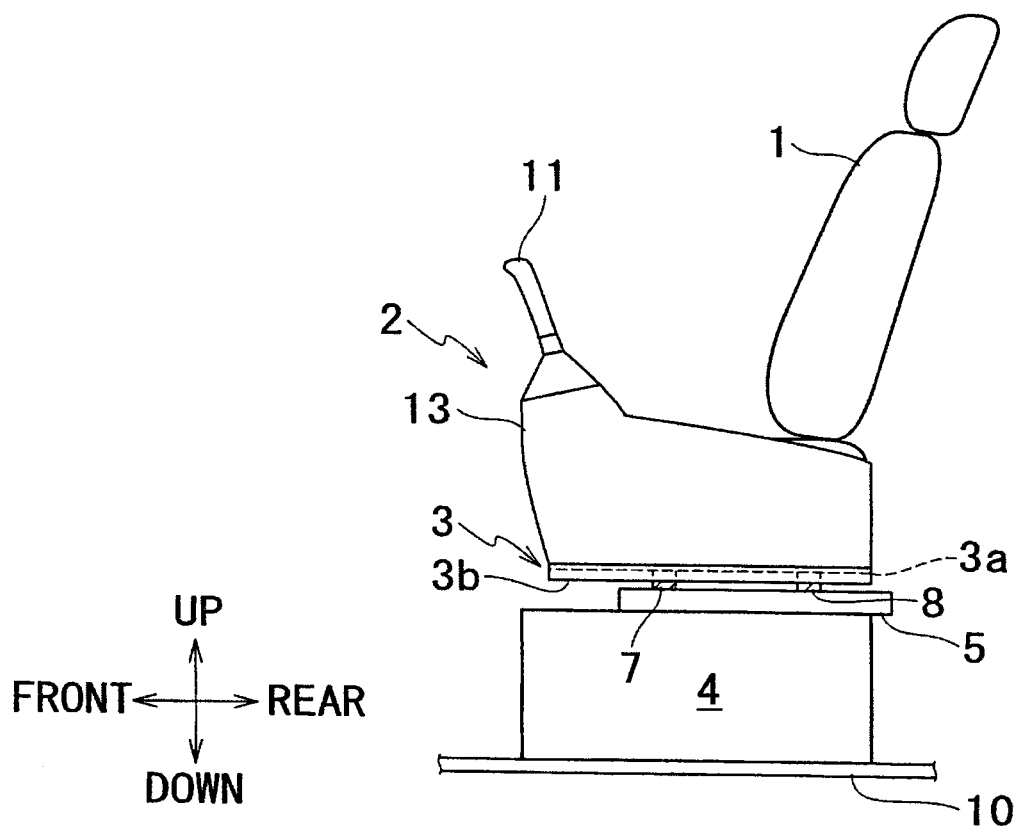
FIG. 2 is a side view of the seat structure illustrated in FIG. 1.
Figure 3:
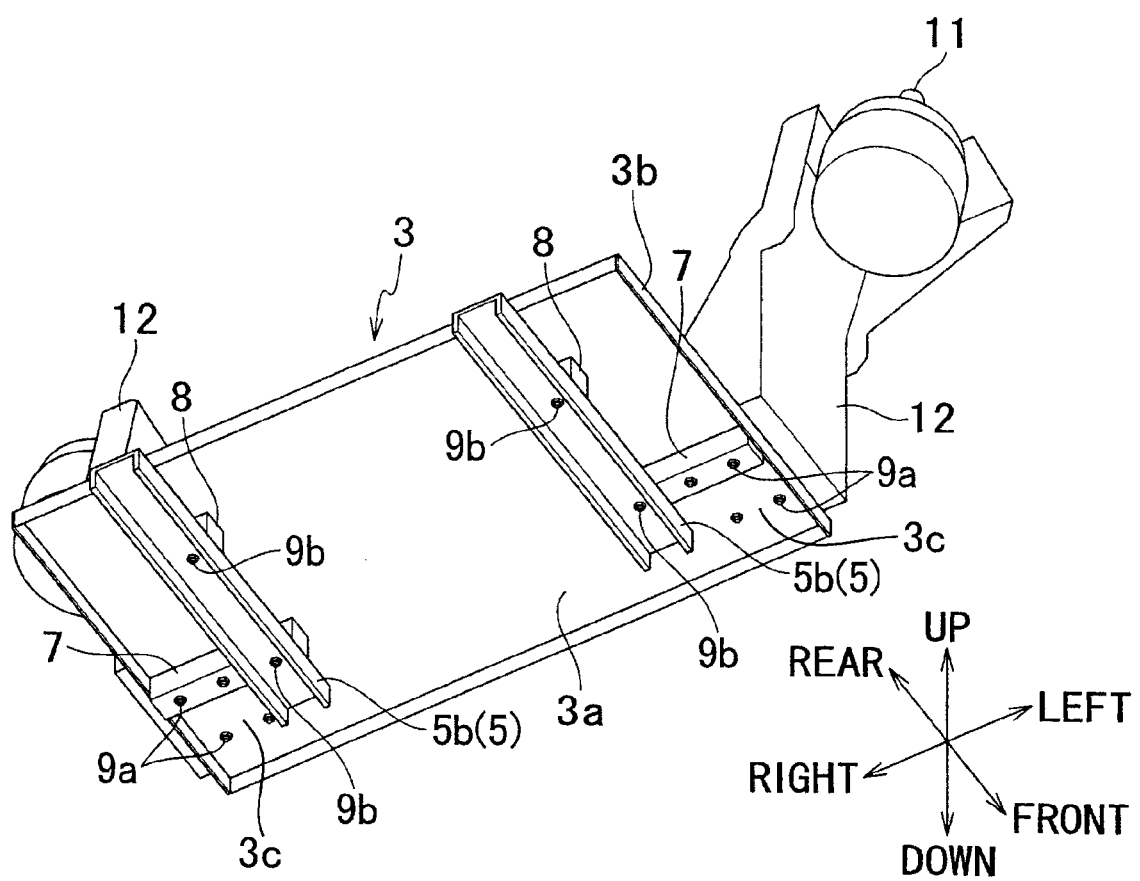
FIG. 3 is a perspective view illustrating a portion of the seat structure illustrated in FIG. 1.

Referring to FIGS. 1 to 3, a construction machine (for example, a hydraulic shovel) according to a first embodiment of the present invention includes a floor plate 10 of a cab and a seat structure 100 attached onto the floor plate 10.

Configuration of Seat Structure

As illustrated in FIGS. 1 and 2, the seat structure 100 (an operator seat structure of a construction machine) of the present embodiment includes a seat stand 4 formed from a steel plate, attached (fixed) onto the floor plate 10, a support plate 3 formed from a steel plate, attached onto the seat stand 4 in a state of being capable of sliding with respect to the seat stand 4, and a seat 1 and a pair of control boxes 2 which are attached (mounted) onto the support plate 3. Each of the control boxes 2 includes an operating lever 11.

The seat 1 and the control boxes 2 are provided on the floor plate 10, and the support plate 3 supports the seat 1 and the control boxes 2 on the floor plate 10.

Specifically, the seat 1 is attached to the center in the left-right direction of the support plate 3 with a group of first slide rails 6 interposed. The control boxes 2 are attached (mounted) to both end portions in the width direction (left-right direction) of the support plate 3 on both sides of the seat 1 in the left-right direction. That is, the support plate 3 has a pair of end portions in the left-right direction, which construct the supporting end portions 3c on which the control boxes 2 are mounted. Moreover, the control boxes 2 are attached directly to the support plate 3.

The first slide rail 6 includes a pair of engagement pieces (reference numerals are not assigned) that extend in the front-rear direction of the support plate 3 and engage with each other so as to be slidable in the front-rear direction. One engagement piece of the first slide rail 6 is attached to an upper surface of the support plate 3, and the other engagement piece is attached to a lower surface of the seat 1. The first slide rail 6 enables the seat 1 to move in the front-rear direction with respect to the control box 2 (the floor plate 10). Moreover, the control box 2 is provided so as to protrude toward the outer side of the seat 1 similarly to the conventional structure.

Here, an outer edge portion of the support plate 3 is bent downward. That is, the support plate 3 includes a flat plate body portion 3a on which the seat 1 and the control boxes 2 are mounted and a rib plate 3b provided across the entire circumference of an outer edge portion of the plate body portion 3a. The rigidity of the support plate 3 is increased by the rib plate 3b.

The control box 2 includes an operating lever 11, a frame 12 (see FIG. 3) formed from a steel plate, to which the operating lever 11 is attached, and a cover 13 formed from a resin, accommodating the frame 12.

The support plate 3 is attached to the seat stand 4 with a group of blocks 7, a group of blocks 8, and a group of second slide rails 5 interposed. That is, the seat structure 100 includes a group of blocks 7, a group of blocks 8, and a group of second slide rails 5. The blocks 7 and 8 and the second slide rail 5 are disposed bilaterally symmetric about the central position in the left-right direction of the support plate 3. Thus, only the blocks 7 and 8 and the second slide rail 5 disposed on the right side will be described.

The second slide rail 5 includes a pair of engagement pieces 5a and 5b that extend in the front-rear direction and engage with each other so as to be slidable in the front-rear direction. One engagement piece 5a is attached to an upper surface of the seat stand 4, and the other engagement piece 5b is attached to lower surfaces of the blocks 7 and 8. The second slide rail 5 enables the seat 1 and the control box 2 to slide integrally in the front-rear direction with respect to the seat stand 4 (the floor plate 10). That is, in order to allow the seat 1 and the control box 2 to slide in the front-rear direction with respect to the floor plate 10, the second slide rail 5 extends in the front-rear direction on a side (the left side) closer to the center in the left-right direction of the support plate 3 than an end surface (a boundary surface between the plate body portion 3a and the rib plate 3b) of the supporting end portion 3c and is attached to the support plate 3.

In a plan view, the second slide rail 5 is attached to the support plate 3 with the blocks 7 and 8 interposed on the side (the left side) closer to the center of the support plate 3 in the left-right direction than the centroid of the control box 2. In the present embodiment, in a plan view, a portion of the second slide rail 5 overlaps a portion of the control box 2. Specifically, in a plan view, a portion of the second slide rail 5 is disposed on the side (the left side) closer to the center in the left-right direction of the support plate 3 than the control box 2. In a plan view, the entire second slide rail 5 may be disposed on the side closer to the center in the left-right direction of the support plate 3 than the control box 2. Moreover, in a plan view, if a condition under which the second slide rail 5 is positioned on the side closer to the center in the left-right direction of the support plate 3 than the centroid of the control box 2 is satisfied, the second slide rail 5 and the control box 2 may overlap completely in a plan view. The centroid of the control box 2 is disposed at a position where the centroid overlaps the supporting end portion 3c of the support plate 3 in a plan view.

Reinforcing Member

Here, the block 7 among the blocks 7 and 8 corresponds to a reinforcing member of the present invention. Hereinafter, the block 7 is sometimes referred to as a reinforcing block 7.

The reinforcing block 7 extends in a direction crossing the second slide rail 5 in a plan view. Moreover, the reinforcing block 7 has a portion that extends toward the end surface of the supporting end portion 3c from a portion in an area of the second slide rail 5 in a plan view, and that is attached to the lower surface of the plate body portion 3a (the supporting end portion 3c) of the support plate 3. Both blocks 7 and 8 are formed from a steel plate (metal), for example. In the present embodiment, the reinforcing block 7 extends from an inner side surface (a surface of center side of the support plate 3) of the second slide rail 5 in a plan view.

FIG. 3 is a perspective view when a portion of the seat structure 100 illustrated in FIG. 1 is seen from an obliquely lower side. As illustrated in FIG. 3, in the present embodiment, the reinforcing block 7 extends in a direction orthogonal to the second slide rail 5 and is attached to the lower surface of the plate body portion 3a (the supporting end portion 3c). Moreover, the reinforcing block 7 is a rod-shaped solid block having a rectangular cross-sectional shape.

As understood from FIGS. 1 to 3, an end portion (right end portion) of the reinforcing block 7 on the side opposite the second slide rail 5 extends up to a right end surface (the right end surface of the supporting end portion 3c) of the support plate 3. The reinforcing block 7 and the second slide rail 5 may not be orthogonal to each other. That is, the reinforcing block 7 may have a portion that extends toward the end surface (the boundary surface between the plate body portion 3a and the rib plate 3b) of the supporting end portion 3c of the support plate 3, on which the control box 2 is mounted, from a position in an area of the second slide rail 5 in a plan view and that is attached to the supporting end portion 3c.

As illustrated in FIG. 3, the frame 12 of the control box 2 and the plate body portion 3a (the supporting end portion 3c) of the support plate 3 are fastened together at a predetermined box fastening position by bolts and nuts (only the bolts are denoted by reference numeral 9a). Moreover, the second slide rail 5 and the plate body portion 3a of the support plate 3 are fastened together at a predetermined rail fastening position by bolts and nuts (only the bolts are denoted by reference numeral 9b). Here, the reinforcing block 7 has also a portion that is attached to the lower surface of the plate body portion 3a in a state where the portion of the reinforcing block 7 overlaps the box fastening position and the rail fastening position in a plan view.

That is, in the portion of the support plate 3 close to the supporting end portion 3c, the frame 12 of the control box 2, the plate body portion 3a of the support plate 3, and the reinforcing block 7 are superimposed in that order. In this state, the frame 12, the plate body portion 3a, and the reinforcing block 7 are fastened together by the bolts 9a and nuts. An internal thread for fastening a bolt is formed on the portion of the reinforcing block 7 overlapping the box fastening position, and the bolt screws into the internal thread.

Moreover, in the portion of the support plate 3 in which the second slide rail 5 is provided, the plate body portion 3a of the support plate 3, the reinforcing block 7, and the second slide rail 5 are superimposed in that order. In this state, the plate body portion 3a, the reinforcing block 7, and the second slide rail 5 are fastened together by the bolts 9b and nuts. That is, the second slide rail 5 is attached to the lower surface side of the support plate 3 with the reinforcing block 7 interposed. Moreover, the second slide rail 5 is attached to the lower surface of the reinforcing block 7 in a state of overlapping the reinforcing block 7 in a plan view. Similarly, an internal thread for fastening a bolt is formed on the portion of the reinforcing block 7 overlapping the rail fastening position, and the bolt screws into the internal thread.

The block 8 is disposed on the rear side of the block 7 with a gap interposed between the blocks 7 and 8 in the front-rear direction. Moreover, the block 8 is a dice-shaped (a quadrangular prism-shaped) solid block in the present embodiment. The block 8 is fastened by the bolts 9b and nuts in a state of being sandwiched between the plate body portion 3a of the support plate 3 and the second slide rail 5. The blocks 7 and 8 enable the support plate 3 and the second slide rail 5 to be fixed stably.

Operation and Effects

According to the seat structure 100 of the present embodiment, the reinforcing block 7 includes a portion that extends toward the end surface of the supporting end portion 3c of the support plate 3 from a position in an area of the second slide rail 5 in a plan view, and that is attached to the supporting end portion 3c of the support plate 3. Thus, the rigidity of the supporting end portion 3c in the up-down direction can be improved by the rigidity of the reinforcing block 7. Therefore, it is possible to increase the rigidity in the up-down direction of the supporting end portion 3c of the support plate 3 supporting the control box 2 without increasing the thickness of the support plate 3. Here, since the reinforcing block 7 and the second slide rail 5 extend in a direction of crossing each other, the rigidity in the up-down direction of the supporting end portion 3c of the support plate 3 is improved by the synergy of the rigidity of the reinforcing block 7 and the second slide rail 5. Moreover, it is possible to obtain the effect of improving the rigidity of the supporting end portion 3c of the support plate 3 with a simple structure in which the reinforcing block 7 having a predetermined length is attached to the supporting end portion 3c of the support plate 3.

Therefore, according to the seat structure 100 of the present embodiment, it is possible to effectively improve the rigidity in the up-down direction of the supporting end portion 3c of the support plate 3 for supporting the control box 2 without greatly changing the thickness of the support plate 3 to which the control box 2 is attached and the conventional structures around the control box 2. Moreover, it is possible to realize the support plate 3 which is thin and highly rigid. In the present embodiment, the reinforcing block 7 extends up to the end surface (the boundary surface between the plate body portion 3a and the rib plate 3b) of the support plate 3. Thus, the effect of improving the rigidity of the support plate 3 is larger as compared to that when the reinforcing block 7 terminates at the position distant from the end surface of the supporting end portion 3c.

Moreover, in the present embodiment, the reinforcing block 7 is attached to the support plate 3 so as to overlap the box fastening position of the control box 2 and the support plate 3 in a plan view. According to this structure, it is possible to reliably improve the rigidity in the up-down direction of the portion of the support plate 3 corresponding to the box fastening position. Moreover, since the internal thread into which the bolt can screw is formed on the reinforcing block 7, it is possible to reduce the number of nuts by screwing the bolt 9a from the upper side.

Moreover, in the present embodiment, the reinforcing block 7 is attached to the support plate 3 so as to overlap the rail fastening position of the second slide rail 5 and the support plate 3 in a plan view. According to this structure, it is possible to reliably improve the rigidity in the up-down direction of the portion of the support plate 3 corresponding to the rail fastening position. Since the internal thread into which the bolt 9b for fastening the second slide rail 5 and the support plate 3 can screw is formed on the reinforcing block 7, when the reinforcing block 7 is disposed on the uppermost or lowermost side, it is possible to reduce the number of nuts.

Moreover, in the present embodiment, the reinforcing block 7 is attached to the lower surface of the support plate 3, and the second slide rail 5 is attached to the lower surface side of the support plate 3 with the reinforcing block 7 interposed. According to this structure, unlike a case where the reinforcing block 7 is attached to the upper surface of the support plate 3 on which the control box 2 is mounted, it is possible to prevent a convex portion from being formed on the upper surface of the support plate 3. Thus, it is possible to prevent the attachment structure of the control box 2 with respect to the support plate 3 from changing greatly from the conventional structure.

The reinforcing block 7 may extend from the first slide rail 6 rather than extending from the second slide rail 5.

Moreover, the reinforcing block 7 may be attached to the upper surface of the support plate 3 rather than the lower surface of the support plate 3.

For example, the reinforcing block 7 may be attached to the upper surface of the support plate 3 in a state where the reinforcing block 7 extends from the slide rail (the first or second slide rail 6 or 5) toward the supporting end portion 3c on which the control box 2 is mounted in a plan view.

Second Embodiment

Figure 4:
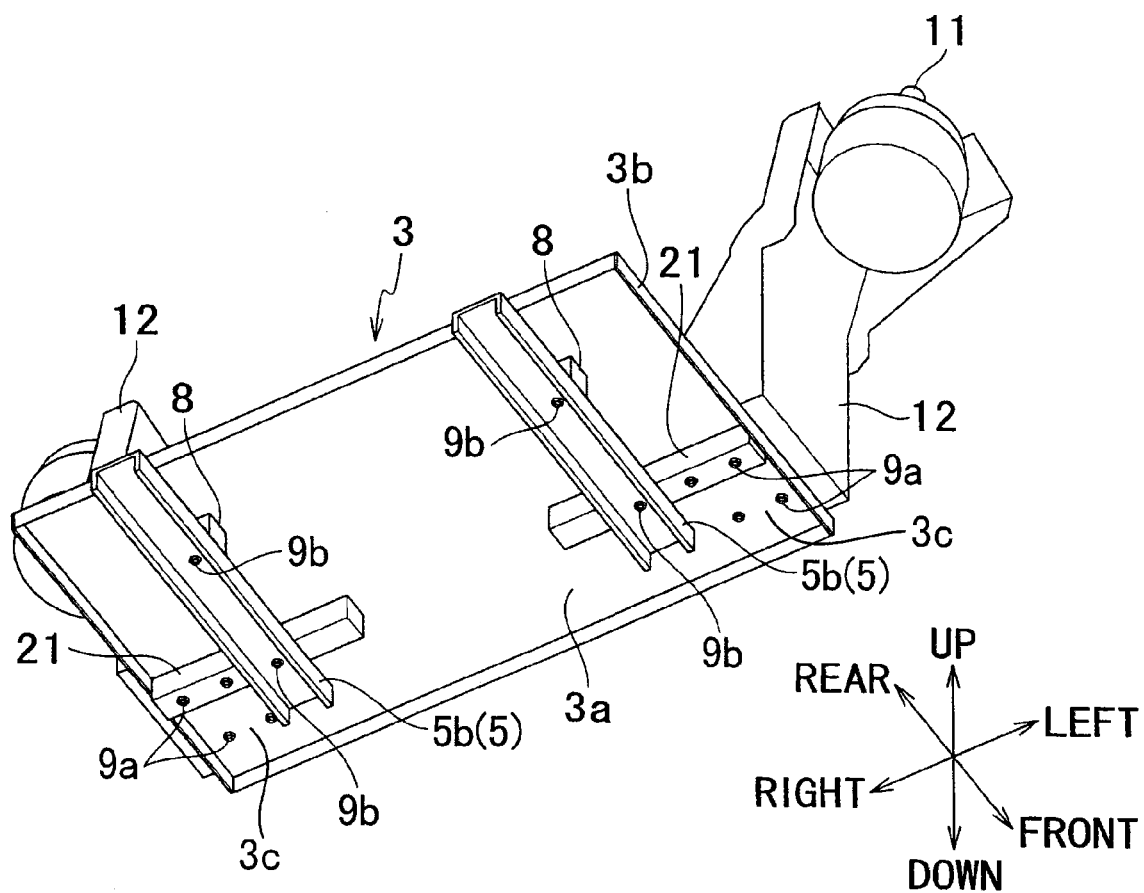
FIG. 4 is a perspective view illustrating a portion of a seat structure according to a second embodiment of the present invention.

FIG. 4 is a perspective view illustrating a portion of a seat structure according to a second embodiment of the present invention. In FIG. 4, the same members as the members illustrated in FIGS. 1 to 3 are denoted by the same reference numerals (the same is true for FIGS. 5 to 12).

A reinforcing block 21 according to the present embodiment has an end portion that extends toward the center side in the left-right direction of the support plate 3 over the second slide rail 5 unlike the reinforcing block 7 illustrated in FIG. 3. According to this structure, it is possible to further improve the rigidity in the up-down direction of the support plate 3.

Third Embodiment

Figure 5:
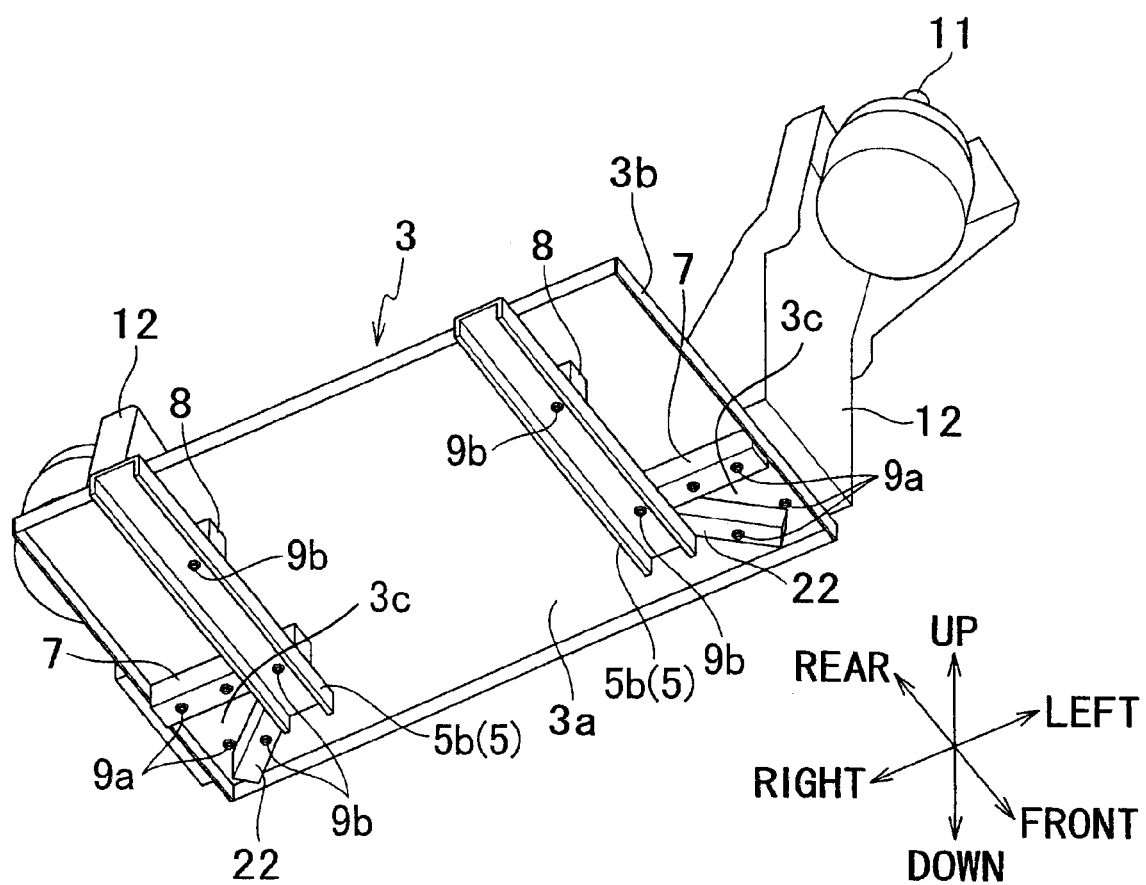
FIG. 5 is a perspective view illustrating a portion of a seat structure according to a third embodiment of the present invention.

FIG. 5 is a perspective view illustrating a portion of a seat structure according to a third embodiment of the present invention. A seat structure according to the present embodiment further includes a reinforcing block 22 attached to the lower surface of the support plate 3 in addition to the seat structure 100 according to the first embodiment. The reinforcing block 22 extends obliquely from an overlapping portion of the second slide rail 5 and the reinforcing block 7 toward a portion of the supporting end portion 3c of the support plate 3 located on the front side of the reinforcing block 7. The reinforcing block 22 is a rod-shaped solid block having a rectangular cross-sectional shape similarly to the reinforcing block 7. In the third embodiment, the reinforcing blocks 7 and 22 correspond to a reinforcing member. According to the third embodiment, since the rigidity in the up-down direction of the supporting end portion 3c of the support plate 3 is improved further, it is possible to prevent vibration or the like of the control box 2 in the left-right direction more effectively.

Fourth Embodiment

Figure 6:
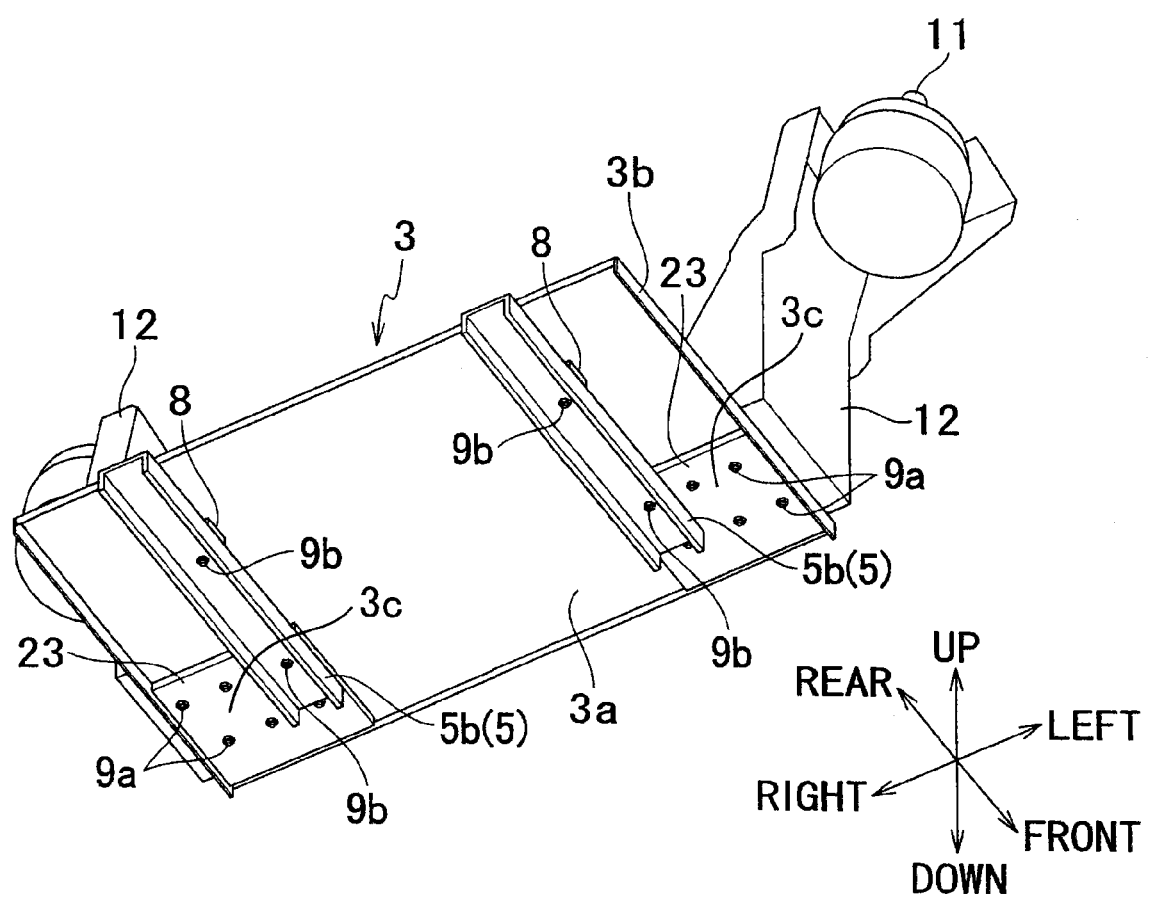
FIG. 6 is a perspective view illustrating a portion of a seat structure according to a fourth embodiment of the present invention.

FIG. 6 is a perspective view illustrating a portion of a seat structure according to a fourth embodiment of the present invention. The seat structure according to the present embodiment includes a reinforcing plate (reinforcing member) 23 that is attached to the lower surface of the support plate 3 so as to cover the entire surface of an attachment portion of the frame 12 of the control box 2 attached to the support plate 3. The reinforcing plate 23 extends toward the end surface of the supporting end portion 3c from a position in an area of the second slide rail 5 in a plan view and is attached to the supporting end portion 3c. According to the fourth embodiment, it is possible to further increase the rigidity in the up-down direction of the support plate 3 similarly to the third embodiment.

Fifth Embodiment

Figure 7:
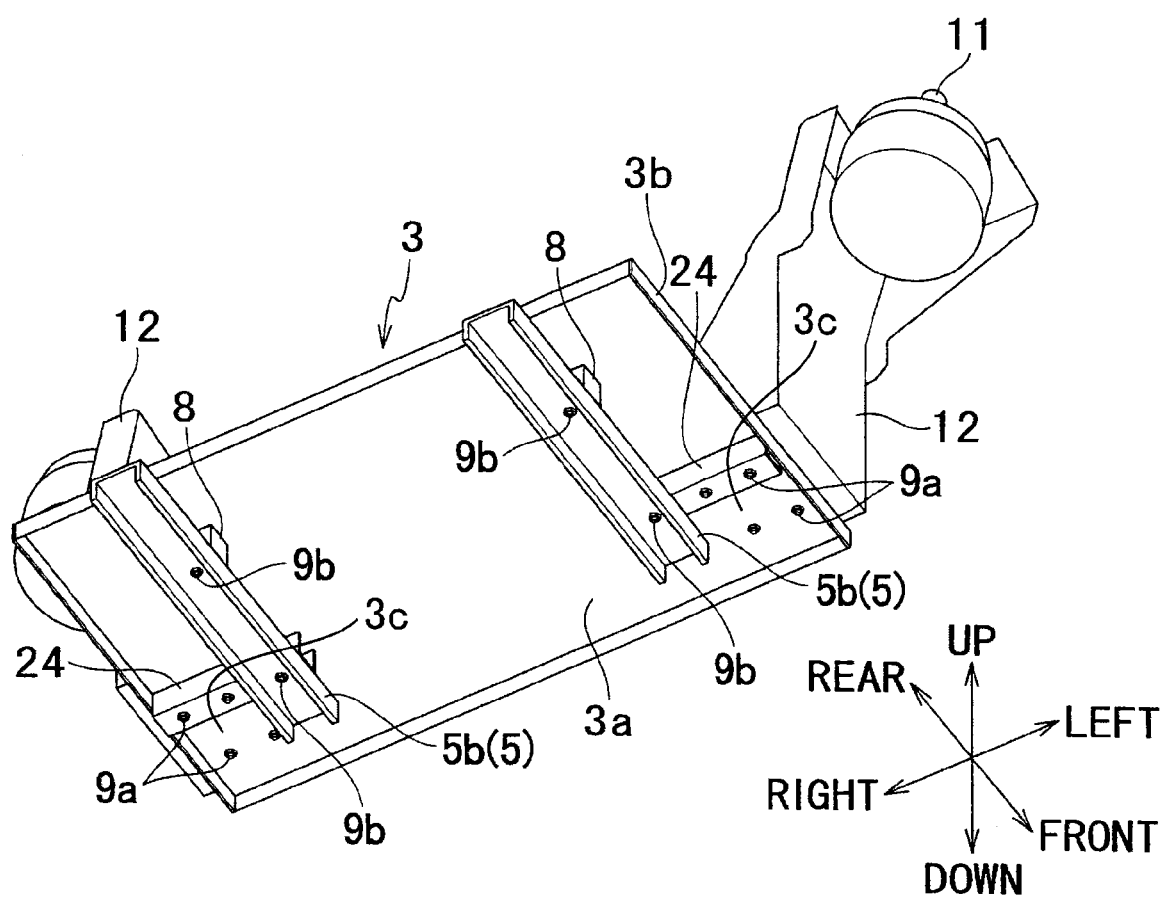
FIG. 7 is a perspective view illustrating a portion of a seat structure according to a fifth embodiment of the present invention.

FIG. 7 is a perspective view illustrating a portion of a seat structure according to a fifth embodiment of the present invention. The seat structure according to the present embodiment includes a reinforcing member 24 having a C-shaped cross-sectional shape. Although the reinforcing block 7 illustrated in FIG. 3 is solid, a reinforcing member having such a shape obtained by bending a plate member may be used as in the present embodiment. Specifically, the reinforcing member 24 includes a flat web and a pair of flat flanges standing on the both edge portion of the flat web. In the present embodiment, the reinforcing member 24 is attached to the support plate 3 in a state where an opening end of the reinforcing member 24 having a C-shaped cross-section is in contact with the lower surface of the support plate 3. According to the fifth embodiment, the rigidity of the support plate 3 is improved more than when one of three wall surfaces of the reinforcing member 24 is in contact with the lower surface of the support plate 3.

Sixth Embodiment

Figure 8:
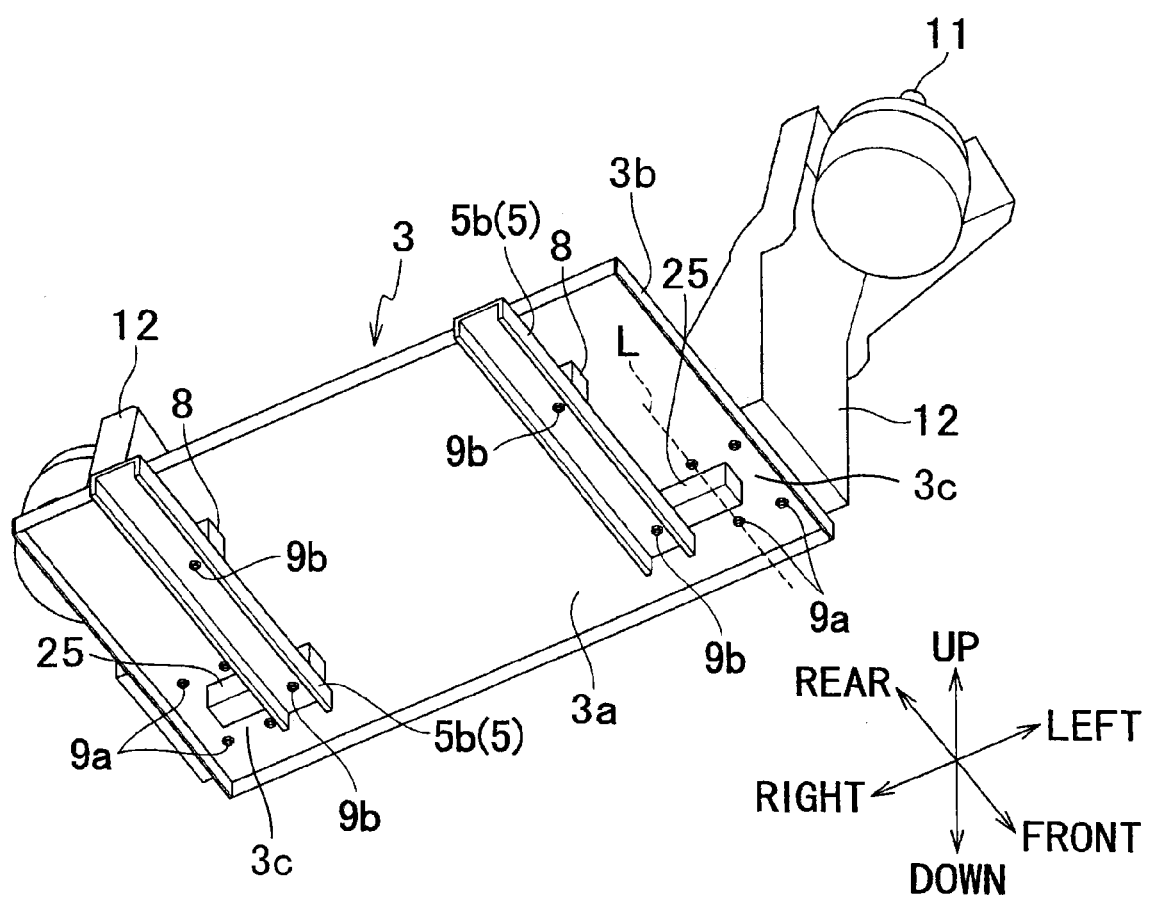
FIG. 8 is a perspective view illustrating a portion of a seat structure according to a sixth embodiment of the present invention.

FIG. 8 is a perspective view illustrating a portion of a seat structure according to a sixth embodiment of the present invention. The seat structure according to the present embodiment includes a reinforcing block (reinforcing member) 25 that is shorter than the reinforcing block 7 illustrated in FIG. 3. An imaginary line L illustrated in FIG. 8 is a line that passes through a box fastening position (the position of the bolt 9a) at which the control box 2 and the support plate 3 are fastened together and extends in the front-rear direction. The reinforcing block 25 that extends toward the supporting end portion 3c of the support plate 3, on which the control box 2 is mounted, from a position in an area of the second slide rail 5 in a plan view extends up to a position that is slightly beyond the imaginary line L in a plan view.

As in the present embodiment, the reinforcing block 25 preferably has a portion that extends from the second slide rail 5 up to at least the imaginary line L extending in the front-rear direction while passing through the position at which the control box 2 and the support plate 3 are fastened together in a plan view. Due to this, the position in the left-right direction of the end portion of the reinforcing block 25 close to the supporting end portion 3c is disposed at the same position as the position in the left-right direction of a supporting position (box fastening position) of the support plate 3, at which the control box 2 is supported, or on the outer side in the left-right direction more than the supporting position. Thus, it is possible to improve the rigidity in the up-down direction of the supporting end portion 3c of the support plate 3 at least at the box fastening position (the imaginary line L) and in the inner range in the left-right direction than the box fastening position.

Seventh Embodiment

Figure 9:
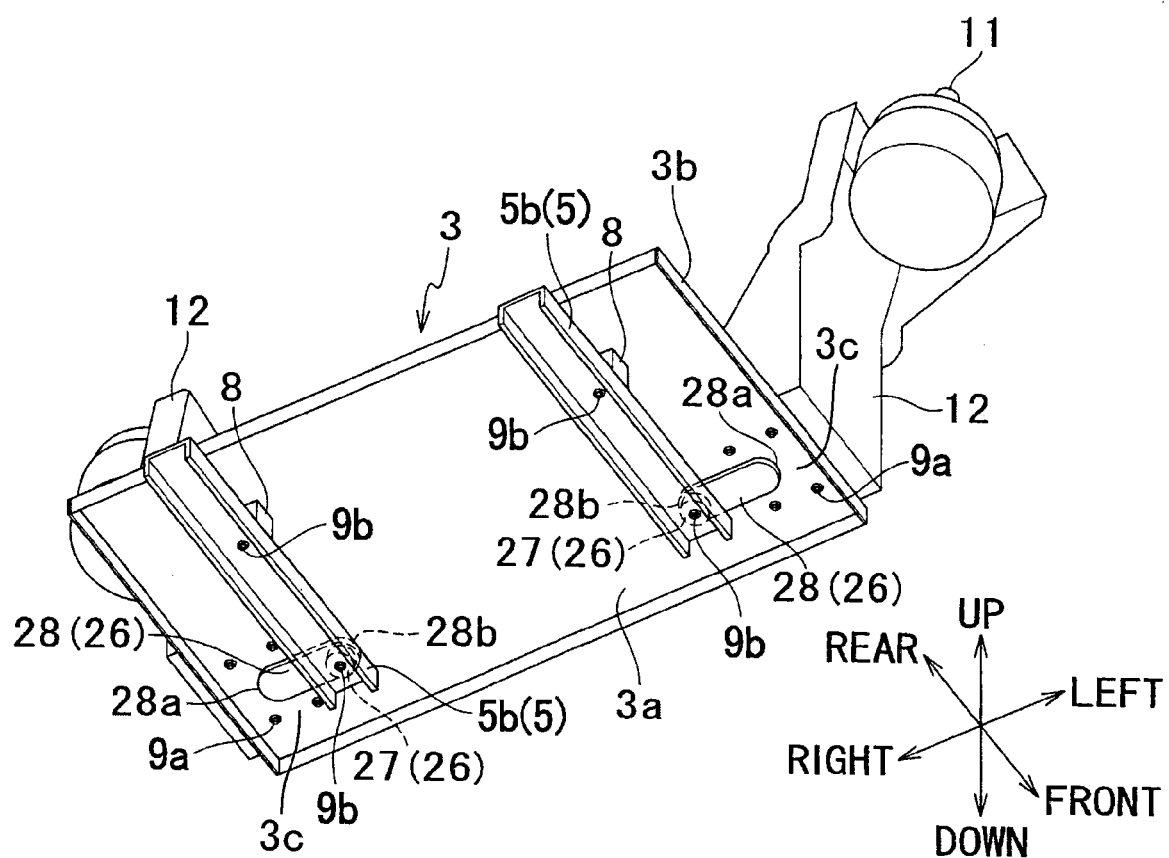
FIG. 9 is a perspective view illustrating a portion of a seat structure according to a seventh embodiment of the present invention.

FIG. 9 is a perspective view illustrating a portion of a seat structure according to a seventh embodiment of the present invention. The seat structure according to the present embodiment includes a reinforcing block 26 that is welded to the lower surface of the support plate 3. The reinforcing block 26 includes an elliptical (track-shaped) reinforcing plate 28 that is welded to the lower surface of the support plate 3 and a cylindrical block 27 provided between the reinforcing plate 28 and the second slide rail 5. That is, the cylindrical block 27 and the elliptical reinforcing plate 28 are superimposed on each other in the up-down direction. Moreover, the reinforcing plate 28 extends from the second slide rail 5 toward the end surface of the supporting end portion 3c of the support plate 3. Since both end portions of the reinforcing block 26 are round, it is possible to suppress stress from concentrating on both of the end portions. Due to this, the rigidity of the support plate 3 supporting the control box 2 is improved further.

In the present embodiment, not only an end portion 28a of the reinforcing plate 28 close to the supporting end portion 3c of the support plate 3 but also an end portion 28b on the opposite side (the side closer to the center of the support plate 3) are round. When only the end portion 28a close to the supporting end portion 3c of the support plate 3 is round, the effect of suppressing concentration of stress is obtained. This is because the force acting on the supporting end portion 3c of the support plate 3 is larger than the force acting on the central portion of the support plate 3.

In the present embodiment, although the reinforcing block 26 includes two members, the reinforcing block may be made up of one member in the same manner as the other embodiments.

Eighth Embodiment

Figure 10:
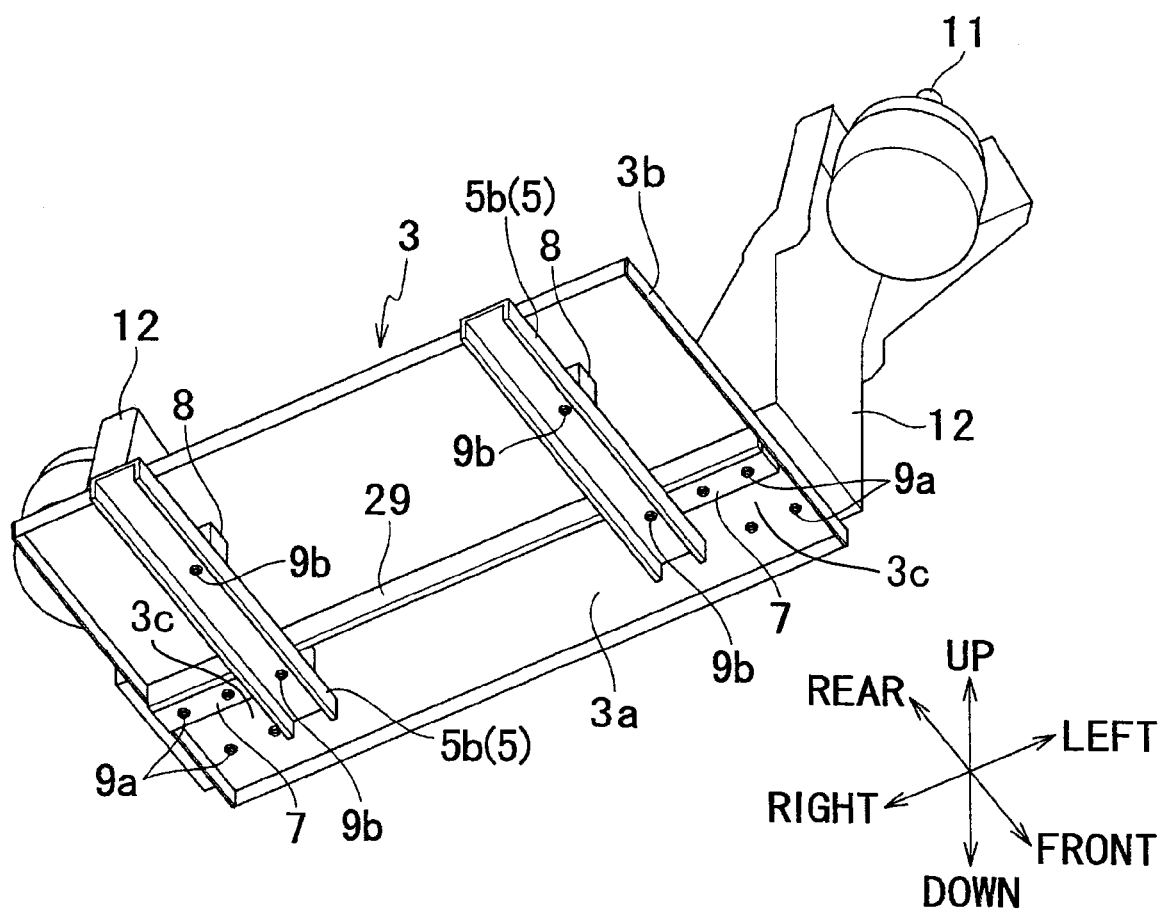
FIG. 10 is a perspective view of a portion of a seat structure according to an eighth embodiment, including a rib member attached to a rear surface of a plate and a reinforcing block fixed by welding to the rib member, illustrated in FIG. 3.

FIG. 10 is a perspective view illustrating a portion of a seat structure according to an eighth embodiment, including a rib member 29 attached to the lower surface of the support plate 3 and the reinforcing block 7 illustrated in FIG. 3, fixed by welding to the rib member 29.

In the present embodiment, the reinforcing blocks 7 attached to the lower surfaces of the supporting end portions 3c of the support plate 3 are connected by a planar rib member 29 extending (in the left-right direction) across between both supporting end portions 3c. This rib member 29 extends in the left-right direction and is attached to the lower surface of the support plate 3 in a state of standing on the lower surface of the support plate 3. The rib member 29 is a reinforcing material of the support plate 3.

According to the present embodiment, it is possible to improve the rigidity in the up-down direction of the support plate 3 with the rib member 29. Moreover, since the reinforcing block 7 and the rib member 29 are connected, it is possible to improve the rigidity in the up-down direction of the support plate 3 more effectively using the rigidity of the reinforcing block 7 and the rib member 29.

Ninth Embodiment

Figure 11:
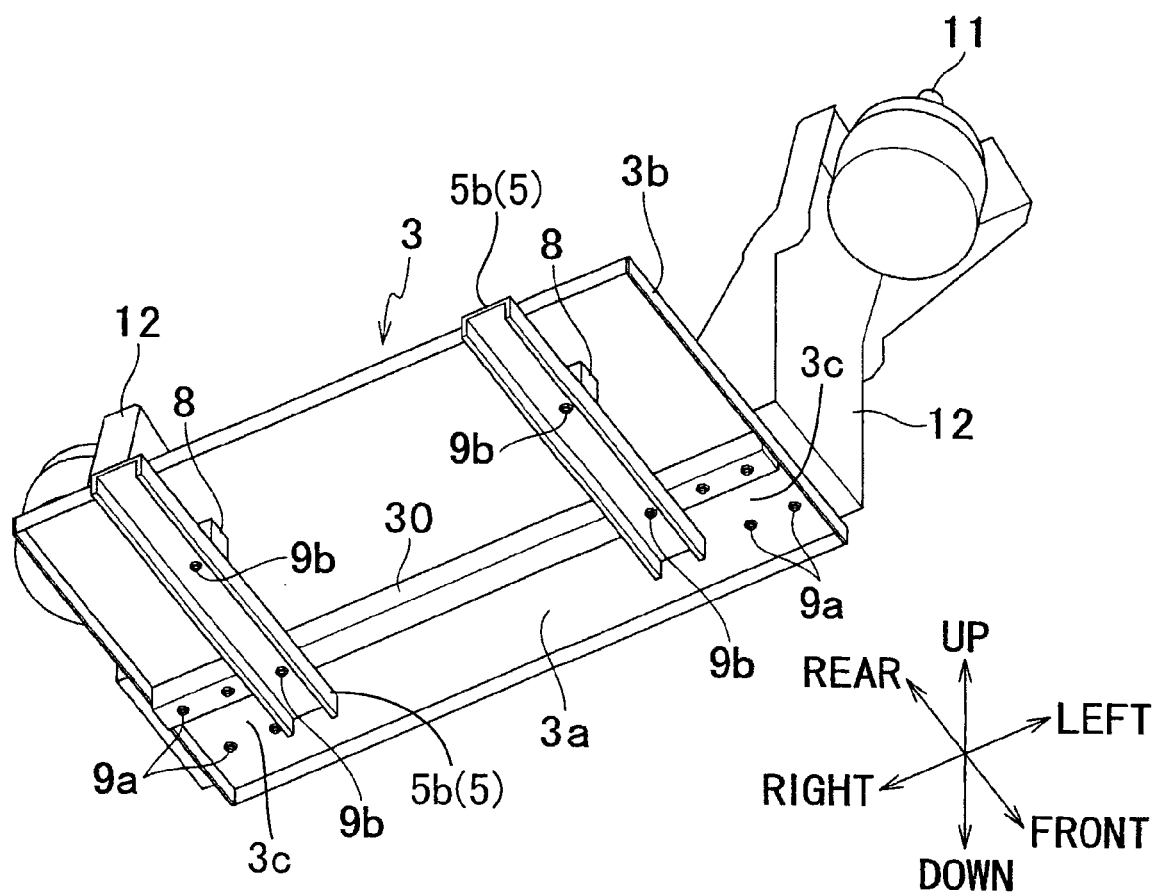
FIG. 11 is a perspective view illustrating a portion of a seat structure according to a ninth embodiment of the present invention.

FIG. 11 is a perspective view illustrating a portion of a seat structure according to a ninth embodiment of the present invention. The seat structure according to the present embodiment includes one reinforcing block 30 extending from one supporting end portion 3c of the support plate 3 up to the other supporting end portion 3c.

According to the reinforcing block 30 according to the present embodiment, it is possible to improve the rigidity in the up-down direction of the support plate 3 in a wider range in the left-right direction.

Tenth Embodiment

Figure 12:
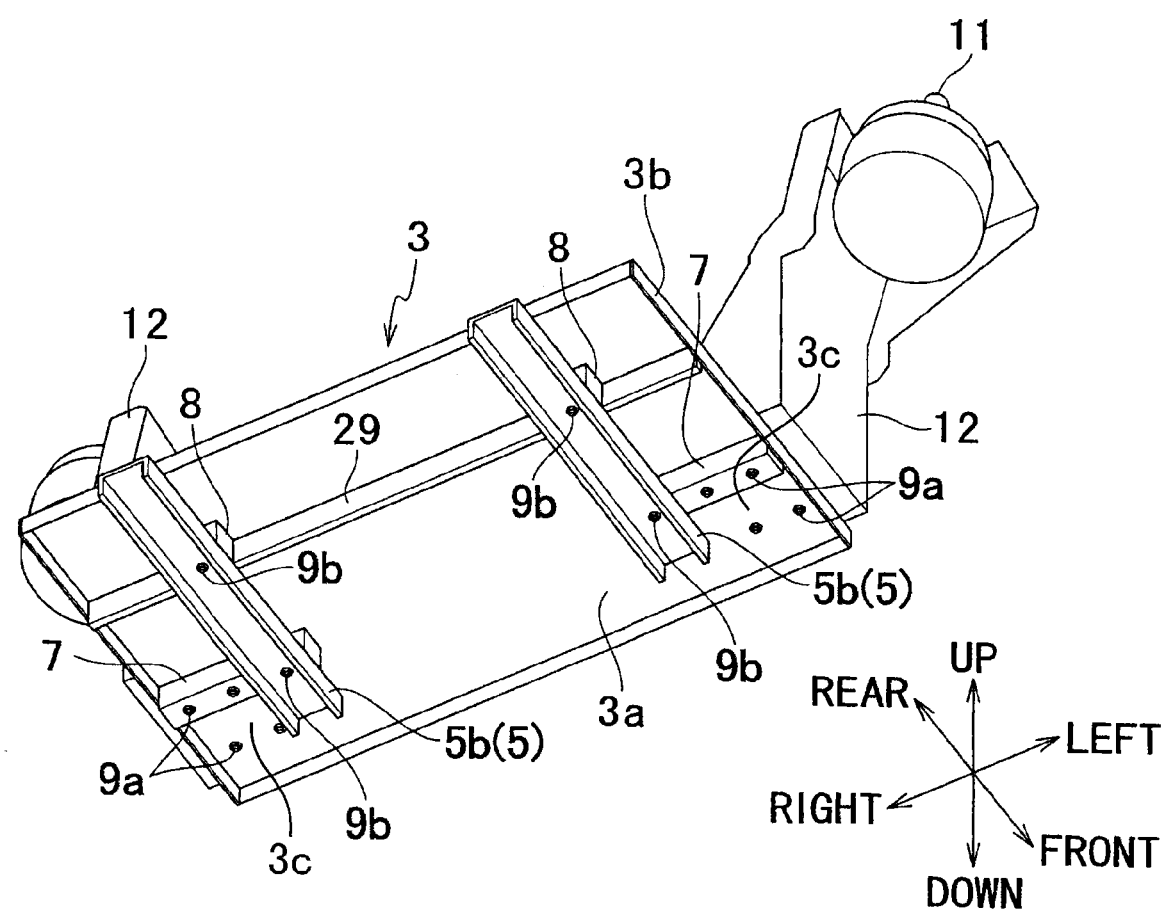
FIG. 12 is a perspective view of a portion of a seat structure according to a tenth embodiment, including a rib member attached to a rear surface of a plate and a block fixed by welding to the rib member, illustrated in FIG. 3.

FIG. 12 is a perspective view illustrating a portion of a seat structure according to a tenth embodiment, including a rib member 29 attached to the lower surface of the support plate 3 and the block 8 illustrated in FIG. 3, fixed by welding to the rib member 29.

In the eighth embodiment illustrated in FIG. 10, the long planar rib member 29 fixed to the lower surface of the support plate 3 is connected to the reinforcing block 7. On the other hand, the rib member 29 according to the present embodiment is provided closer to the rear side than the rib member 29 of the eighth embodiment and is connected to a cubic block 8 which does not aim to increase the rigidity of the control box 2 in particular.

According to the present embodiment, it is possible to further improve the rigidity of the support plate 3 in the up-down direction similarly to the other embodiments.

Other Modifications

In the embodiments illustrated in FIGS. 1 to 12, in any embodiment, the reinforcing member is attached to a front portion of the supporting end portions 3c in the width direction (the left-right direction) of the support plate 3. On the other hand, the reinforcing member may be attached to a rear portion of the support plate 3 so as to reinforce the rear portion of the supporting end portions 3c of the support plate 3. For example, like the reinforcing block 7, if the block 8 is configured to extend toward the supporting end portion 3c of the support plate 3, it is possible to reinforce the rear portion of the support plate 3. Moreover, a reinforcing member may be attached to an intermediate portion in addition to or in place of the front portion and the rear portion of the supporting end portions 3c in the width direction (left-right direction) of the support plate 3 so as to reinforce the support plate 3.

As described above, if a condition that the reinforcing member extends from the slide rail toward the supporting end portion 3c of the support plate 3 on which the control box 2 is mounted and is attached to the support plate 3 is satisfied, the effect that the rigidity in the up-down direction of the support plate 3 can be effectively increased is obtained regardless of the arrangement of the reinforcing member with respect to the support plate 3. Moreover, for example, as in the embodiment illustrated in FIG. 3, a plurality of reinforcing members may be provided in one supporting end portion 3c (on one side) rather than providing one reinforcing member in one (on one side) of both supporting end portions 3c of the support plate 3.

Moreover, in the embodiment illustrated in FIG. 3, the reinforcing block 7 is attached to the support plate 3 so as to pass through the box fastening position of the control box 2 and the support plate 3 and the rail fastening position of the second slide rail 5 and the support plate 3. However, the reinforcing block 7 may be attached to the support plate 3 in a state where the reinforcing block 7 does not pass through the box fastening position and the rail fastening position. For example, the reinforcing blocks 25 and 26 of the embodiments illustrated in FIGS. 8 and 9 pass through the rail fastening position of the second slide rail 5 and the support plate 3 but do not pass through the box fastening position of the control box 2 and the support plate 3.

The specific embodiments described above mainly include inventions having the following configuration.

That is, the present invention provides a construction machine including: a floor plate; a seat provided on the floor plate; a control box arranged on the floor plate so as to be aligned with the seat in a left-right direction; a support plate that supports the seat and the control box on the floor plate and that includes an end portion in the left-right direction configuring a supporting end portion on which the control box is mounted; a slide rail that extends in a front-rear direction on a side closer to the center in the left-right direction of the support plate than an end surface of the supporting end portion and is attached to the support plate in order to allow at least one of the seat and the control box to slide in the front-rear direction relative to the floor plate; and a reinforcing member that extends in a direction crossing the slide rail in a plan view and that includes a portion extending toward the end surface of the supporting end portion from a position in an area of the slide rail in a plan view, and the portion being attached to the supporting end portion of the support plate.

According to the present invention, the reinforcing member includes a portion that extends toward the end surface of the supporting end portion of the support plate from a position in an area of the slide rail in a plan view, and that is attached to the supporting end portion of the support plate. Thus, the rigidity of the supporting end portion in the up-down direction can be improved by the rigidity of the reinforcing member. Here, since the reinforcing member and the slide rail extend in a direction of crossing each other, the rigidity in the up-down direction of the supporting end portion of the support plate can be improved effectively by the synergy of the rigidity of the reinforcing member and the slide rail. Moreover, it is possible to obtain the effect of improving the rigidity of the supporting end portion of the support plate with a simple structure in which the reinforcing member is attached to the supporting end portion of the support plate.

Therefore, it is possible to effectively improve the rigidity in the up-down direction of the supporting end portion of the support plate for supporting the control box without greatly changing the thickness of the conventional plate to which the control box is attached and conventional structures around the control box.

In the construction machine, it is preferable that the control box and the supporting end portion of the support plate are fastened together at a predetermined box fastening position, and the reinforcing member has a portion that extends from the slide rail up to at least an imaginary line extending in the front-rear direction while passing through the box fastening position in a plan view.

According to this aspect, the position in the left-right direction of the end of the reinforcing member close to the supporting end portion is disposed at the same position in the left-right direction of a supporting position (box fastening position) of the support plate, at which the control box is supported, or on the outer side in the left-right direction than the supporting position. Thus, it is possible to improve the rigidity in the up-down direction of the supporting end portion of the support plate at least at the box fastening position (imaginary line) and in the inner range (the central side of the support plate 3) in the left-right direction than the box fastening position.

It is preferable that the construction machine further includes a rib member that extends in the left-right direction and that is attached to the support plate, and the rib member and the reinforcing member are connected.

According to this aspect, it is possible to improve the rigidity in the up-down direction of the support plate with the rib member. Moreover, since the rib member and the reinforcing member are connected, it is possible to improve the rigidity in the up-down direction of the support plate more effectively using the rigidity of both members.

In the construction machine, it is preferable that the reinforcing member extends from the supporting end portion of the support plate up to an end portion of the support plate on an opposite side to the supporting end portion in the left-right direction.

According to this aspect, it is possible to improve the rigidity in the up-down direction of the support plate in a wider range in the left-right direction.

In the construction machine, it is preferable that an end portion of the reinforcing member positioned close to the supporting end portion of the support plate in the left-right direction is welded to the support plate and has a round shape.

According to this aspect, since the end portion of the reinforcing member welded to the support plate has a round shape, it is possible to suppress concentration of stress on the welding portion of the end portion.

In the construction machine, it is preferable that the control box and the supporting end portion of the support plate are fastened together at a predetermined box fastening position, and the reinforcing member is attached to the support plate so as to overlap the box fastening position in a plan view.

According to this aspect, it is possible to reliably improve the rigidity in the up-down direction of the portion of the support plate corresponding to the box fastening position. Moreover, when an internal thread into which a bolt capable of fastening the control box and the support plate can screw is formed on the reinforcing member, the reinforcing member can be also used as a nut. Thus, it is possible to reduce the number of nuts depending on the way that the support plate, the control box, and the reinforcing member are arranged.

In the construction machine, it is preferable that the slide rail and the support plate are fastened together at a predetermined rail fastening position, and the reinforcing member is attached to the support plate so as to overlap the rail fastening position in a plan view.

According to this aspect, it is possible to reliably improve the rigidity in the up-down direction of the portion of the support plate corresponding to the rail fastening position. Moreover, when an internal thread into which a bolt for fastening the slide rail and the support plate can screw is formed on the reinforcing member, the reinforcing member can be also used as a nut. Thus, it is possible to reduce the number of nuts depending on the way that the support plate, the slide rail, and the reinforcing member are arranged.

In the construction machine, it is preferable that the reinforcing member is attached to a lower surface of the support plate, and the slide rail is attached to a lower surface side of the support plate via the reinforcing member.

According to this aspect, unlike a case where the reinforcing member is attached to an upper surface of the support plate on which the control box is mounted, it is possible to prevent a convex portion from being formed on the upper surface of the support plate. Thus, it is possible to prevent the attachment structure of the control box with respect to the support plate from changing greatly from the conventional structure.

This application is based on Japanese Patent applications Nos. 2013-196457 and 2014-112104 filed in Japan Patent Office on Sep. 24, 2013 and May 30, 2014, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A construction machine comprising:
a floor plate:
a seat provided on the floor plate;
a control box arranged on the floor plate so as to be aligned with the seat in a left-right direction;
a support plate that supports the seat and the control box on the floor plate and that includes an end portion in the left-right direction configuring a supporting end portion on which the control box is mounted:
a slide rail that extends in a front-rear direction on a side closer to the center in the left-right direction of the support plate than an end surface of the supporting end portion and is attached to the support plate in order to allow at least one of the seat and the control box to slide in the front-rear direction elative to the floor plate; and
a reinforcing member that extends in a direction crossing the slide rail in a plan view and that includes a portion extending toward the end surface of the supporting end portion from a position in an area of the slide rail in a plan view, and the portion being attached to the supporting end portion of the support plate, wherein
the reinforcing member is attached to a lower surface of the support plate, and
the slide rail is attached to a lower surface side of the support plate via the reinforcing member.

2. A construction machine comprising:
a floor plate;
a seat provided on the floor plate:
a control box arranged on the floor plate so as to be aligned with the seat in a left-right direction:
a support plate that supports the seat and the control box on the floor plate and that includes an end portion in the left-right direction configuring a supporting end portion on which the control box is mounted;
a slide rail that extends in a front-rear direction on a side closer to the center in the left-right direction of the support plate than an end surface of the supporting end portion and is attached to the support plate in order to allow at least one of the seat and the control box to slide in the front-rear direction relative to the floor plate; and
a reinforcing member that extends in a direction crossing the slide rail in a plan view and that includes a portion extending toward the end surface of the supporting end portion from a position in an area of the slide rail in a plan view, and the portion being attached to the supporting end portion of the support plate, wherein
the control box and the supporting end portion of the support plate are fastened together at a predetermined box fastening position, and
the reinforcing member has a portion that extends from the slide rail up to at least an imaginary line extending in the front-rear direction while passing through the box fastening position in a plan view.

3. The construction machine according to claim 2, wherein the reinforcing member is attached to the support plate so as to overlap the box fastening position in a plan view.

4. The construction machine according to claim 2, wherein the reinforcing member extends from the supporting end portion of the support plate up to an end portion of the support plate on an opposite side to the supporting end portion in the left-right direction.

5. The construction machine according to claim 2, wherein an end portion of the reinforcing a member positioned close to the supporting end portion of the support plate in the left-right direction is welded to the support plate and has a round shape.

6. The construction machine according to claim 2, wherein
   the slide rail and the support plate are fastened together at a predetermined rail fastening position, and
   the reinforcing member is attached to the support plate so as to overlap the rail fastening position in a plan view.

7. The construction machine according to claim 2, further comprising:
   a rib member that extends in the left-right direction and that is attached to the support plate,
   wherein the rib member and the reinforcing member are connected.

* * * * *